C. W. BREWSTER.
TRACK CIRCUIT FOR TRAIN CONTROL SYSTEMS.
APPLICATION FILED DEC. 6, 1916. RENEWED JULY 17, 1918.
1,425,315.
Patented Aug. 8, 1922.
2 SHEETS—SHEET 1.
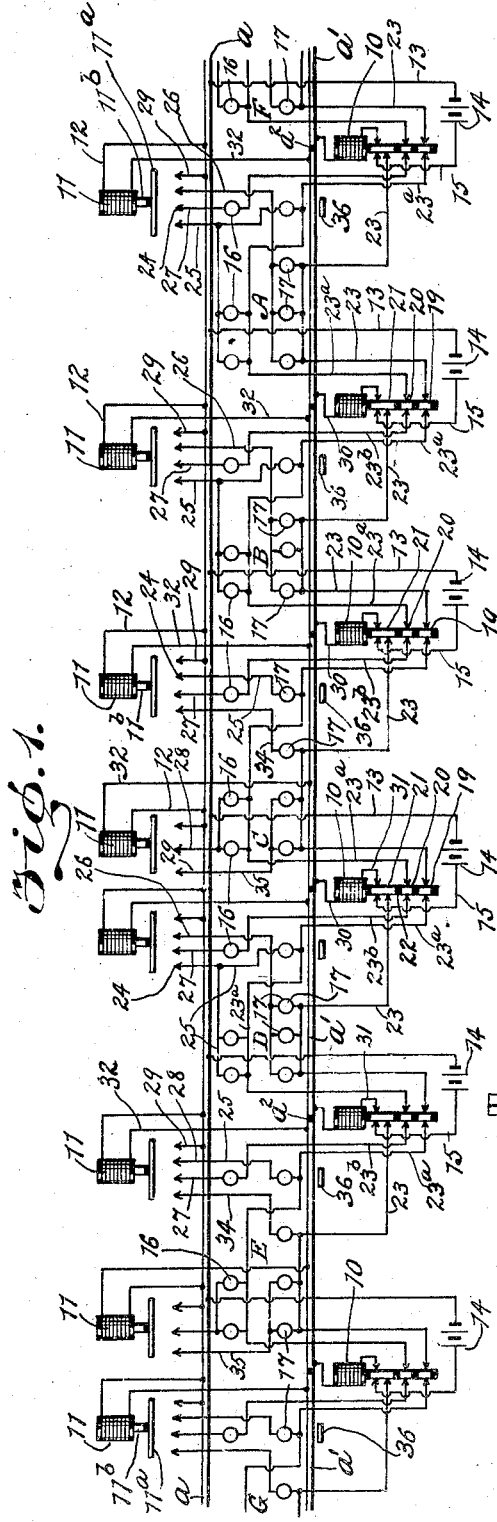
INVENTOR
Charles W. Brewster
BY
Edson Bernhard
ATTORNEYS C. W. BREWSTER.
TRACK CIRCUIT FOR TRAIN CONTROL SYSTEMS.
APPLICATION FILED DEC. 6, 1916. RENEWED JULY 17, 1918.

1,425,315.

Patented Aug. 8, 1922.

INVENTOR.
Charles H. Brewster
BY
H. J. Bernhard
ATTORNEY.

UNITED STATES PATENT OFFICE.

CHARLES W. BREWSTER, OF NEW YORK, N. Y., ASSIGNOR TO BREWSTER TRAIN CONTROL CO. INC., OF NEW YORK, N. Y., A CORPORATION OF NEW YORK.

TRACK CIRCUIT FOR TRAIN-CONTROL SYSTEMS.

1,425,315.        Specification of Letters Patent.        Patented Aug. 8, 1922.

Continuation of application Serial No. 70,579, filed January 6, 1916. This application filed December 6, 1916, Serial No. 135,286. Renewed July 17, 1918. Serial No. 245,405.

*To all whom it may concern:*

Be it known that I, CHARLES W. BREWSTER, a citizen of the United States, residing in the city of New York, borough of Manhattan, county and State of New York, have invented a certain new and useful Track Circuit for Train-Control Systems, of which the following is a specification.

This invention is a system of track circuits for use in connection with means on a wheeled vehicle whereby the movement of said vehicle upon or over a railway track may be controlled both as respects the signal indications and the speed of said vehicle.

The invention of this application is a continuation of a prior application Serial No. 70579 filed by me on January 6, 1916, for "automatic train control and signal" in so far as concerns matter common to the two said applications.

In this invention the track circuit is of such a nature as to make provision for so controlling the signal indications and the brake mechanism constituting the equipment on a moving vehicle as to meet the conditions of service which (*a*) call for freedom in the movement of the vehicle under normal or full speed and at the same time advising the driver or motorman of the condition of the track ahead; (*b*) should the vehicle approach an occupied block at too great a speed, the progress of such vehicle toward said occupied block is automatically reduced to a lower speed, suitable means being provided in both the track signal system and in the vehicle equipment whereby the distance intervening the approaching vehicle and the preceding vehicle will determine automatically the speed at which the following vehicle may travel and after such setting of the maximum speed limits under such conditions the driver or motorman will be permitted to proceed up to the entrance of such preceding occupied block at such regulated (reduced) speed; (*c*) should a following vehicle attempt to enter a preceding occupied block at such reduced speed, then the movement of the following vehicle toward the occupied block is first automatically stopped and thereafter the motorman or driver is permitted to again start the vehicle but under such restrictions as to speed that the following vehicle can enter and travel within an occupied block under conditions assuring a maximum of safety both to the preceding vehicle and the following vehicle, such progress at slow speed being the only speed at which said following vehicle can proceed within said occupied block and until the entire length of said block shall have been traversed, whereby in due season said following vehicle will arrive at or pass one of the magnetic interferences with which the track circuit is equipped, whereupon the signal indication on said following vehicle will be changed from danger to caution or from caution to clear or said vehicle will be brought to a full stop; (*d*) the track circuit is so related to the vehicle equipment that physical contact between the stationary parts and the moving parts are wholly avoided, thus minimizing the liability to disarrangement of either of said parts and the influence of the track circuits upon the vehicle equipment is obtained independent of climatic and weather conditions.

The track equipment is of such a nature that each block or section requires a low consumption of current from a suitable source to maintain each particular block or section in a condition for service, thus obtaining economy in current consumption, but when a particular block or section is occupied by a vehicle, then the full energy from the available source of supply is brought into condition for use automatically, provided, however, that the track ahead is not occupied by a vehicle within signalling distance of the particular block so occupied.

The track equipment includes, preferably, a closed track circuit for each block, although an open track circuit may be utilized, the closed track circuit being preferred for the reason that should a rail or conductor be broken or a battery be exhausted then the signal on the vehicle is displayed at danger and said vehicle brought to a stop.

According to this invention, the track equipment for each block or section embodies a relay and a source of direct current energy in a normally closed track circuit, the latter including also one or more high resistance relays, the latter being positioned at or near one end of the block, whereas the first named relay and the energy source are at or near the opposite end of the block, as a result of which organization I am enabled to secure accuracy in the operation of the signals, notwithstanding the equipment may be subjected to the influence of extraneous currents or to the existence of current leakage across the insulations of the sectional track rail or between the parallel rails of the track, and it is possible, also, to install the track equipment utilizing direct current at substantial economy as compared with the cost of equipment dependent for its operation upon the energy of alternating current.

In the drawings

Figure 1 is a plan view of the track circuits for use in connection with a vehicle equipment such as disclosed in my prior application.

Figures 2 and 3 are sectional elevations of one of the relays, and

Figure 4 is a horizontal section on the line 4—4 of Figure 3.

Figure 5:
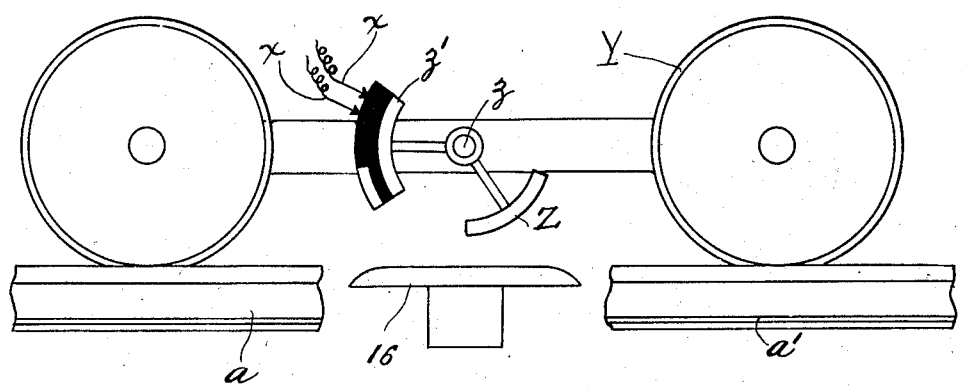
Figure 5 is a view illustrating the relation of a track magnet to an armature on a movable vehicle whereby the presence of said vehicle upon the rails acts to ground a track circuit, the latter including track magnets extending in series in a block different from the block in which the ground is effected.

In the system diagrammatically represented in Fig. 1, the track is shown as embodying a continuous rail $a$ and a sectional rail $a'$, the parts of said sectional rail being electrically insulated at $a^2$ so as to produce a succession of "blocks" each of any required length, five of said blocks A B C D E and parts of sixth and seventh blocks F G being represented. Each block is equipped as follows:—

At the point where a vehicle enters each block is positioned a solenoid-relay 10, the coil of which is connected by a conductor 30 to the rail $a'$ of said block. One or more solenoids 11 are connected also to the rail $a'$, preferably at or near the point where a vehicle emerges from each block, or near each group of track magnets 16, 17, and from this solenoid 11 (or from these solenoids 11) a conductor 12 leads to the continuous rail $a$. From said rail, $a$, leads a conductor 13 to the negative pole of battery 14, from the positive pole of which battery a conductor 15 leads to a switch member 21 of the solenoid-relay 10 and thence by conductor 31 to the coil of said solenoid 10, thus establishing a closed track circuit for the current to flow from battery 14, conductor 15, switch member 21, conductor 31, solenoid-relay 10, conductor 30, rail $a'$, conductor 32 to the coil or coils of solenoid or solenoids 11, conductor 12, a part of rail $a$, conductor 13 to the negative pole of battery 14. The solenoids 10, 11, included in the closed track circuit are energized under normal conditions by current from battery 14, so that with both the coils 10, 11, connected in series with battery 14 as shown, there will be a minimum flow of current through solenoid 10, which minimum flow of current through said solenoid 10 holds the core thereof normally in a position to complete the circuits through certain track magnets of blocks positioned rearwardly of the particular block, as will be presently described. At the same time the coils of solenoid 11 holds the cores thereof in raised positions free from certain contacts in circuits leading to the track magnets of the block with which the solenoids 11 are directly associated. The solenoids thus perform distinct functions with respect to the block to which said solenoids are connected; thus, solenoids 11 open and close the circuits to the track magnets which are associated with the same block so that said solenoid 11 is a local make and break device for said particular group of track magnets, thus acting as a local circuit closer, whereas the other solenoid 10 is the signal controlling element for the track magnets in blocks positioned rearwardly and for definite distances of the particular block under consideration. It may be stated that with a vehicle present in a particular block, the flow of current from the battery to solenoid 11 is shunted by the wheels and axles across the rails $a\ a'$ of that block, thus de-energizing the coil of solenoid 11, whereupon the core $11^b$ drops by gravity and the switch members $11^a$ of said core makes certain contacts so as to connect the track magnets electrically with the return rail $a$, as will appear hereinafter.

The track circuit of this invention is so related to the vehicle equipment of my prior application that there is at all times displayed in the view of the engine driver or motorman a signal of one character or another for indicating the condition of the track ahead; thus, with a clear track for a certain distance or for a certain number of blocks ahead, the signal on an approaching vehicle indicates clear; with a vehicle in a block a certain distance ahead the signal on the approaching vehicle is changed automatically to cut out the clear signal and to display caution signal when the following vehicle reaches a certain distance in the rear of a preceding vehicle, but with the following vehicle proceeding to a point still closer to the preceding vehicle, then the signal is once more changed on the following vehicle so as to cut out the caution signal and to display a danger signal.

To the attainment of these ends, it is preferred to equip each block with two rows of magnets adapted to be so controlled as to influence the vehicle equipment for the display of signals according to the condition of the track and to the distance separating a following vehicle from a preceding vehicle. The number and arrangement of the track magnets in each block is dependent in a certain measure upon the proximity or remoteness of the particular block from a "point of congestion," so called, by which term is meant any condition of the track at which trains may be likely to congregate or to stop, such e. g. as a station either for express trains or local trains, a switch or a crossover, or a curve in the track. Thus, in blocks remote to the point of congestion, the number of track magnets may be at a minimum, say two in a row, whereas in blocks closer to the point of congestion, the track magnets in each of two rows are increased in number so as to actuate the cab signal control mechanism an increasing number of times the nearer the vehicle approaches the point of congestion.

With each block A B C D E F G, etc., there is associated two rows of track magnets, the magnets of one row being indicated at 16, and the magnets of the other row at 17, said magnets 16, 17, operating to control the caution signal and the danger signal, respectively, but the influence of the track magnets upon the equipment carried by a following vehicle is dependent upon the condition of the preceding blocks controlled through the solenoids 10. As shown, each solenoid 10 includes a plunger or core $10^a$ provided with wiping contacts, 19, 20, 21 electrically insulated at 22 and cooperating with the circuit contacts positioned intermediate the conductors leading from the battery 14 to the track magnets in a certain number of blocks positioned in the rear of the particular block adapted to be occupied by a vehicle, the arrangement being such as to bring about the following results; with a particular block occupied by a vehicle, the current from battery 14 associated with that block is shunted out of the circuit closing solenoid 11 by the wheels and axle across the rails $a$ $a'$ so as to establish an increased flow of current in the controlling solenoid 10, thus moving the core $10^a$ and shifting the contacts 19, 20, 21, to interrupt the circuits as follows:—first, to the magnets 17 of the first block, i. e. the block immediately in the rear of the occupied block as well as the last magnet 17 at the exit of the second block in the rear; second, to interrupt all the magnets 16 in the first and second blocks in the rear, and, third, the circuit to the last magnet 16 in the third block in the rear. It is thus apparent that, under the conditions recited, the solenoid 10 performs certain important functions in interrupting the circuits to the magnets 17 positioned in the first and second blocks in the rear for influencing the danger signal and, also, interrupts the circuits to the magnets 16 in the second and third blocks in the rear to influence the caution signal, whereby there may be said to be an overlap in the relation to each other of the caution and danger controlling magnets in the second and third blocks in the rear.

It is preferred to wire the magnets as follows:—

The battery conductor 15 runs direct to contact 21 of the first solenoid 10, say in block A, thence a conductor 23 runs from contact 21 of the first solenoid 10 to the magnets 17 except the last one of the series 17 of the first block B in the rear; thence to switch member 19 of the solenoid 10 of block B, thence by conductor $23^a$ from said switch member 19 of solenoid 10 in block B to last track magnet 17 of block C and all but last track magnets 16 of block C to switch member 20 of solenoid 10 block C, conductor $23^b$ of block D to last track magnet 16 of block D, thus constituting a continuous lead from battery 14 of one block to as many blocks in the rear as it may be desired to control the signals; thus, the signal control herein shown extends rearwardly from an occupied block A through two complete blocks B, C, and a part of a third block, D. It is apparent that said conductor 23, $23^a$, $23^b$, is in effect a continuous conductor from the positive side of the battery 14 of one block to the specified magnets 16, 17 of three blocks in the rear. With the track clear and under normal conditions, the flow of current from battery 14 of one block to certain track magnets in three blocks in the rear is interrupted because the solenoid 11 of each block is energized under said normal conditions to break the return connections from the specified magnets to the battery 14.

The track magnets under normal conditions are thus de-energized and the circuits from the battery to the magnets are open; this is considered advantageous for the reasons that economy of current is obtained, and by energizing the magnets intermittently, instead of continuously, it is possible to so wind them as to obtain an increased magnetic pull between the magnets and the elements of the vehicle equipment.

The preceding detailed description sets forth the circuit connections from the positive side of a battery in one block, to the magnets 16, 17 of three blocks in the rear, under normal conditions, and it is now desired to explain the manner of obtaining the return connections from the specified magnets to the negative side of the battery when the particular block is occupied, normal conditions prevailing, and with a clear track ahead of the occupied block. In this connection it is proper to say that the return connections of one block are the same as similar connections for every other block of the system, and that the electrically continuous rail $a$ or the ground is utilized as a common return. The return circuit connections of each block include one or more circuit closing solenoids 11, the moving part 11$^b$ of which is adapted to make electrical connection with a group of contacts 24; from one contact 24 a conductor 25 leads to the final magnet 17 of each block; from another contact 24 leads a conductor 26 to the remainder of the magnets 17 in blocks A B D; from another contact 24 a conductor 27 leads to the final magnet 16 in the row in each block; from another contact 24 a conductor 28 leads to the remainder of the magnets 16 in blocks C E; from the last contact 24 a conductor 29 is tapped on to return rail $a$ or the ground; from one contact 24 of blocks C, E leads a conductor 34 to one or more track magnets 17 except the last magnet 17 in blocks C, E, and from one contact in blocks C, E leads a conductor 35 which runs to one or more track magnets 17 of blocks C, E. With the solenoid 11 de-energized by the presence of a vehicle in a particular block, the core or plunger 11$^b$ drops for member 11$^a$ to make electrical connection with one group of contacts 24, and thus all the return connections are completed from the magnets 16, 17 of a particular block to the return rail $a$ or the ground leading to the respective batteries 14 in the blocks preceding the occupied blocks with which said magnets are associated.

In addition to the track magnets, 16, 17, the solenoids, 10, 11, and the other devices heretofore described, each block is equipped with means for interrupting electrical circuits in the vehicle equipment, said circuit interrupting means being positioned adjacent to or at a suitable distance from the point at which a vehicle leaves the block. Various forms of the circuit interrupting devices may be employed, but as shown this part is a magnetic interference occupying such position in the track that as a vehicle passes the device the latter is interposed in the magnetic field of a certain magnet on the vehicle so as to shunt the field of said magnet and thereby change the signals should the condition of the track warrant such change or to operate the brake control to a full stop should the track conditions justify the same. The magnetic interference is in the form of a metallic bar, 36, preferably of magnetizable soft iron or steel, extending upwardly from the track near one of the rails.

From the foregoing description it is apparent that the track circuit is adapted to be grounded by the presence of rolling stock, such as a vehicle, as shown in Fig. 5, upon the rails $a$ $a'$ of the track and within a given block thereof, said track circuit including stationary magnets such as 16 or 17, or 16 and 17, extending in series substantially throughout a different block or blocks from that in which the ground may be effected. As shown in Fig. 5, said vehicle Y is equipped with a traveling armature, as Z, which is so positioned as to travel within the field of said track magnets, said armature operating to influence or control the vehicle equipment whereof the armature or armatures are elements, which vehicle equipment includes a cab signal and a brake mechanism, all as herein described and as more particularly set forth in my prior application. As shown in Fig. 5, the train carried armature Z is mounted at $z$ on the vehicle Y for rocking movement, and this armature embodies a member $z'$, the latter being in operative relation to a circuit of said vehicle equipment, the conductors of which circuit are indicated at $x$ $x$ and which circuit includes means for effecting the train control, either a signal as herein described or a brake mechanism as also herein described, or both the signal and the brake.

The track magnets 16 and 17, or 16 or 17, extend in series throughout the track and preferably extend in series within sections or "blocks" (so called) of said track, said track magnets (in one or more series within each block) being energized by current from batteries 14 as described. Said track magnets produce a magnetic circuit, or in other words, produce means possessing magnetic permeability, the fields of said magnets operating in a well known manner to emanate lines of force through which magnetic fields the armature (one or more) on a moving vehicle is adapted to pass so that armature will be influenced by the fields of the magnets, as a result of which the armature (one or more) controls the signal mechanism or the brake mechanism, or both, as herein described. The armature on the vehicle is so related to the track magnets as to be free from physical contact therewith, and thus the track magnets and the vehicle-carried armature are separated by an intervening air gap, although in the movement of the vehicle along the track said armature thereon passes within the fields of the track magnet.

When the track is unoccupied, the magnetic field produced by one or more series of track magnets in the successive blocks is of a desired length suited to the conditions of vehicular traffic, but the presence of vehicles (one or more) upon the track, and the proximity of two of such vehicles to each other, produces automatically a change or variation in the operative length of the magnetic field afforded by said track magnets. The presence of a vehicle in block A shunts current from solenoid 11 by the wheels and axles of said vehicle in contact with the rails, thus grounding the circuit in one block, and the de-energization of said solenoid 11 of one block so influences the companion solenoid 10 that the latter interrupts the track circuit herein shown to magnets 17 of the first block in the rear of the occupied block and also interrupts the track circuit to the first magnet 17 at the exit of the second block in the rear of the occupied block, and at the same time the solenoid 10 interrupts all the magnets 16 in the first and second blocks in the rear of the occupied block, and also interrupts the last magnet 16 in the rear third block in the rear of said occupied block; in short, the grounding of a track circuit by the presence of a vehicle in one block operates to de-energize certain of the track magnets extending in series substantially throughout a different block or blocks from that in which the grounding aforesaid is or may be effected.

It will be noted that the track circuit includes the continuous and electrically interrupted rails of the track, and that the armature on the vehicle is of a length less than the intervals between the fields of adjacent track magnets.

In the track system herein disclosed the solenoids 10, 11 are responsive to the presence or absence of a vehicle on the track rails to bring about a variation in the operative length of the two magnetic fields afforded by the two series of track magnets 16, 17. As stated, the two magnetic fields afforded one by the magnets 16 and the other by the magnets 17 are, in the absence of vehicles, of a length suited to the conditions of vehicular traffic; but the length of said magnetic fields are varied by the presence of one or two vehicles upon the rails of the track and such length of the magnetic fields is dependent, also, upon the proximity of said two vehicles to each other. With a following vehicle moving in a block in rear of a block occupied by a preceding vehicle, the solenoids 11 of the blocks traversed by the following vehicle are so influenced that on the continued forward movement of the following vehicle the solenoids 10 are in like manner successively influenced so as to reduce the operative length of the magnetic circuits afforded by the track magnets, which decrease in the operative length of the magnetic circuits afforded by the track magnets is in proportion to a decrease in the distance separating the two vehicles.

It is apparent that the magnetic circuit formed by one series of track magnets, say magnets 16, may be in service or be de-energized by the presence of a vehicle on the rails or by the proximity of two vehicles on the rails so that the magnetic circiut afforded by magnets 16 is or may be of a desired or varied length, whereas the magnetic circuit afforded by track magnets 17 is or may be in service according as the block is vacant or occupied so that the magnets 17 produce a magnetic circuit the length of which is dependent upon the presence or absence of a vehicle or vehicles on the rails, which two magnetic circuits (afforded by the two series of track magnets and their complemental batteries and solenoids) are or may be in overlapping relation to each other for the purpose of effecting the control of the vehicle equipment so as to operate the signals and the speed control mechanism on a passing vehicle.

As is well known, service of the battery 14 occasions diminished energy, but to provide a margin of safety in maintaining each block in a serviceable condition, means are employed to interrupt the local track circuit through solenoids 10, 11 of said block when the battery reaches a certain minimum strength.

I may use a cut out of the form described in my prior application wherein said cut out utilizes a coil connected in a shunt around the battery, but in this invention it is desired to simplify the arrangement by employing a wide contact plate 21 on the insulated part 22 of the solenoid plunger. Conductors 15, 23, 23ª, 23ᵇ and 31 are attached to contacts 38, 39, 40, 41, 42, 43 and 44, see Figures 2, 3 and 4, said contacts being included in circuit with the battery 14 so that when the current strength falls below a predetermined minimum the coil of solenoid 10 is not energized sufficiently to hold the core 10ᵇ up in a normal position against the action of gravity, see Figure 2, whereupon the core or plunger will drop or fall so as to lower the contacts 19, 20, 21 and interrupt the battery circuit through the contacts 38, 39, 40, 41, 42, 43, 44, thus breaking the battery circuit for the particular block with which the battery is connected.

As disclosed in my prior application the track circuits are used in connection with a vehicle equipment which includes signals for indicating clear, caution and danger; a source of energy on the vehicle; certain signal-controlling solenoids which in turn are influenced by armatures responsive to the track magnets 16, 17; a brake mechanism; a speed control mechanism cooperating with the brake mechanism; and certain actuating means all as will more fully and at large appear by reference to said application.

It should be stated that when no vehicle is present in a block, the magnets 16, 17 of that block are de-energized because solenoid 11 of that block is energized so as to hold armature 11ª away from contacts 24, thus opening the circuits to the magnets 16, 17 of each unoccupied block, the current from at least three batteries 14 flowing through switch member 19, 20, 21 of solenoid 10 of each block; but as a vehicle moves along the track, certain armatures thereon are brought within the fields of the magnets 16, 17, said armatures being moved by the magnetic pull of said magnets 16, 17, in the event of the magnets being energized by current from the batteries 14 in the proper blocks of the track ahead of said moving vehicle. Assuming that normal conditions prevail, that the track ahead is clear, and that the vehicle is traveling in block D toward the right with a clear signal displayed, the action is as follows:—The wheels and axles of the vehicle shunt the current out of solenoid 11, allowing armature 11ª to drop against contacts 24 of the particular block occupied by the vehicle. Said armature thus completes the return connections from magnets 16, 17 of the occupied block to the batteries 14 of block A and block B respectively, as follows:—With the vehicle in block D, the magnets 16 of said block D are energized by current flowing from battery 14 of block A, through conductor 15, switch member 21 of solenoid 10 in block A, conductor 23, switch member 19 of solenoid 10 in block B, conductor 23ª, switch member 20 of solenoid 10 in block C, conductor 23ᵇ to last track magnet 16 in block D, conductor 27 in block D to armature 11ª in solenoid 11 block D, conductor 29 of block D to return rail $a$ and thence to conductor 13 to battery 14 of block A. The last magnet 17 of block D is at the same time and under the same conditions energized as follows:—From battery 14 of block B current flows through conductor 15, switch member 21 of solenoid 10 in block B, conductor 23, switch member 19 of solenoid 10 block C, conductor 23ª, to the last magnet 17 in block D, thence by the return connections including conductor 25 block D, switch member 11ª of solenoid 11 block D, conductor 29 tapped on to return rail $a$ to conductor 13 block B, to battery 14 in the latter block.

The other magnets 16 of the block D are tapped on to conductor 23ª for the positive connection to the battery 14 in block B, the return connection being through a branch of conductor 25, block D, to contacts 24, solenoid 11, block D, conductor 29, return rail $a$, conductor 13, to battery 14 of block B.

The other magnets 17 of block D are tapped on to conductor 23 block D, switch member 21 of solenoid 10 of block C, conductor 15, to positive of battery 14 block C, and for return connections through conductor 26, contacts 24, armature 11ª of solenoid 11 in block D, conductor 29 return rail $a$, conductor 13, to battery 14 of block C.

As the vehicle progresses through a block, the track-magnet armatures on said vehicle pass through the magnetic fields of track magnets 16, 17, and at the same time a certain vehicle-supported circuit-maker assumes such relation to the magnetic interrupter 36 that the latter is brought into the magnetic field of said vehicle-supported circuit-maker. These operations have no apparent effect upon the clear signal should the track ahead be clear and the signal system be in normal condition.

Assuming that a second or preceding vehicle occupies the block A and that a following vehicle with a clear signal displayed is approaching the exit point of block D, a change of the signal indication from clear to caution is effected on said following vehicle when it passes the magnetic interrupter 36 and the magnets 16, 17 nearest the exit of said block D. This change of signal is brought about by the preceding vehicle in block A shunting the current so as to interrupt the flow of current from battery 14 of block A to the last track magnet 16 of block D, hence as the track magnet armature on the following vehicle passes the de-energized magnet 16 of block D, said track magnet armature will remain in its normal position, i. e. it will not be influenced by a magnetic pull from said magnet 16 when said vehicle-supported circuit-maker of the preceding vehicle is passing the interference 36 in block D, the interference armature will not be attracted for an appreciable interval of time because of the presence of the interference 36 between said interference armature and the poles of the interference magnet, this operation opening the circuit on the vehicle controlling the caution signal and causing the armature to drop and display the caution signal. At this time the other track armature is attracted by the track magnet 17 so as to complete a certain circuit on the moving vehicle for preventing the changing of the signal on the vehicle to display danger. Assuming that the preceding or second vehicle remains in block A, the following vehicle now passes into block C, and is free to proceed therein until it reaches the interference 36 of said block C without any change of signal indication, caution signal being constantly displayed because magnets 16 of block C are de-energized. As the following vehicle passes over the final magnets 16, 17 of block C and the interference 36 of said block C, the said interference is interposed between the armature and the poles of the circuit maker on said moving vehicle so as to interrupt the circuit on the vehicle, and as the track armature of said following vehicle passes over a de-energized magnet 17 in block C, at the same instant that the circuit maker interrupts the circuit it follows that the track armature is not attracted by said de-energized magnet 17 of block C, thus displaying the danger signal.

The danger signal is thus displayed in the following vehicle so that it must come to a stop in block B and remain in said block B or near the end thereof next to interference 36 in said block B, this condition prevailing until a change takes place in block A. As the preceding vehicle moves out of block A and into the next preceding block, the magnets 17 of block B become energized and the track armature is attracted so as to complete the circuit for cutting out the danger signal and displaying the caution signal. With block A vacated by the forward movement of the preceding vehicle into the next preceding block, the following vehicle with the caution signal displayed is free to move into block A, but when the preceding vehicle moves into two blocks ahead and with the following vehicle in block B, then the signal indication of the following vehicle is changed from caution to clear.

It will be noted that in each block there is shown a series of three magnets 16 and four magnets 17, there being a greater number of magnets 17 than there are magnets 16. This is for the purpose of enabling a vehicle, with a danger signal displayed, to approach quite close to the magnetic interrupter 36 at the exit of the block, and further when the vehicle comes to rest, at the exit of the block, the proper track magnet armature on the moving vehicle is positioned over the next to the last track magnet 17 in the block.

Further, the magnet 16, next to the last track magnet 16 in the series in each block, is positioned sufficiently to the rear of said last magnet 16 and the interference 36 to enable the proper cooperating track magnet-armature on the vehicle to resume its normal position after passing the field of the first named magnet 16 and before reaching or passing the interference 36 and the last magnet 16 opposite to this interference.

Furthermore, it will be noted by reference to Figs. 1, 3 and 4 that when the coil of solenoid 10 is not sufficiently energized by current from the battery 14 the gravity or weight of the plunger will cause it to descend, thus withdrawing the contact plate 21 from electrical contact with the plates 42, 43, 44 to which are attached conductors 15, 23 and 31, and accordingly the battery circuit through the solenoid core is interrupted. It is apparent, also, that at the same time the contacts 19, 21 will be withdrawn also from electrical engagement with the plates 38, 41 and 39, 40 respectively, so as to interrupt the circuits to which conductor 23, 23ª and 23ª, 23ᵇ are respectively connected as shown in Figure 1, thus breaking the track circuits between the blocks.

Having thus fully described the invention, what I claim as new, and desire to secure by Letters Patent is:—

1. In a system of train control, a track equipment embodying rails divided into blocks, each block having associated therewith a source of electrical energy, a solenoid connected across the rails and in series with the energy source, a plurality of track magnets, a second solenoid having contacts connected in series with track magnets of blocks positioned rearwardly thereof whereby said second solenoid is adapted to be influenced by the first solenoid so as to de-energize the track magnets of rearwardly located blocks, and means in cooperative relation to the first solenoid and the second solenoid whereby said second solenoid is adapted to be influenced by a change in the first solenoid.

2. In a system of train control, a track equipment embodying rails divided into blocks, each block having associated therewith a source of electrical energy, a solenoid connected across the rails and in series with the energy source, and adapted to be de-energized by the presence of a vehicle in the block whereby current is shunted from the solenoid by the wheels and axles of said vehicle, a plurality of track magnets, and a second solenoid connected with the block equipment so as to be influenced by an increased flow of current when the first solenoid is deenergized, said second solenoid operating contacts connected with track magnets of blocks located rearwardly thereof and operating to de-energize the same when the first solenoid is shunted out of service by a vehicle in the block.

3. In a system of train control, a track equipment including rails divided into blocks, a source of electrical energy, a plurality of track magnets, a plurality of solenoids one of which cooperates with the rails and the other of which controls track magnets in other blocks so as to de-energize said other track magnets when the first solenoid is shunted out of service by the presence of a vehicle in the block, and a magnetic interference in each block.

4. In a system of train control, a track equipment including rails divided into blocks, a source of electrical energy, a plurality of track magnets, and a plurality of solenoids one of which cooperates with the rails and the other of which controls track magnets in other blocks so as to de-energize said other track magnets when the first solenoid is shunted out of service by the presence of a vehicle in the block.

5. In a system of train control, a track equipment including rails divided into blocks each having associated therewith a source of energy, a plurality of track magnets, and a plurality of solenoids, one of which is connected with the battery and connected across the track, and the other of which is in circuit with the battery and controls track magnets in blocks positioned rearwardly thereof, said second solenoid including a coil, a core, a plurality of circuit contacts, and a series of switches carried by the core and insulated electrically therefrom so as to have electrical engagement with the circuit contacts in one position of the core.

6. In a system of train control, a track equipment including rails divided into blocks and each having a source of energy, a series of track magnets, a solenoid connected with the battery and across the rails of the block, and a second solenoid connected in circuit with the track battery and controlling the track magnets of blocks located rearwardly thereof, said second solenoid including a coil, a core, a switch block movable with the core, a series of circuit terminals connected with the track magnets as aforesaid, and switch members carried by the switch block and adapted to make electrical connection with the circuit terminals, said second solenoid being influenced by the normal flow of current from the battery to energize the track magnets in the rearwardly located blocks and adapted to be influenced by an increased flow of current when the first solenoid is shunted by the presence of a vehicle in the block so that the second solenoid is operable by such increased flow of current to interrupt the circuits to the track magnets, whereby any break in the circuits operates to de-energize the second solenoid for permitting the core and switches thereof to move to a third position.

7. In a system of train control, a track equipment including rails divided to produce a succession of blocks, each block being provided with a source of energy, a series of track magnets, a solenoid having its coil connected across rails of the track and in series with the battery, said solenoid including a series of contacts, a core carrying a switch block, and a switch member attached to the switch block and adapted to engage with the contacts in one position of the core, and a second solenoid connected with the battery and having contacts connected in series with track magnets in the blocks located rearwardly thereof.

8. In a track circuit for a train signal and control system, a magnet the movable core of which is provided with a series of contacts movable therewith, and two series of relatively fixed contacts cooperating with the contacts on said movable core, combined with a source of energy in series with certain of said relatively fixed contacts and connected to energize the coil of said magnet, and track circuits including conductors connected with other of said relatively fixed contacts, the arrangement being such that a variation in the potential of the current from the source of energy will permit said magnet core to drop by gravity and thus interrupt the track circuits and also the flow of current to the magnet coil.

9. A train signal and control system having a track-circuit adapted to be grounded by rolling stock and having included therein stationary track magnets in series extending substantially throughout a different block from that in which the ground may be effected, in combination with a traveling train-carried armature disposed in the field of said magnets.

10. A train signal and control system having a normally closed track-circuit adapted to be grounded by rolling stock and having included therein stationary track magnets arranged in series extending substantially throughout one block, and track rails in another block, in combination with a traveling train-carried armature disposed in the field of said magnets.

11. A train signal and control system having a track-circuit adapted to be grounded by rolling stock, and having included therein stationary track magnets in series in a different block from that in which the ground may be effected, in combination with a traveling train-carried armature disposed intermittently in the field of one or more of said magnets.

12. A train signal and control system having a track-circuit adapted to be grounded by rolling stock, and having included therein stationary track magnets arranged in parallel series in successive blocks separated from that in which the ground may be effected, in combination with traveling train-carried armatures disposed in the fields respectively of said series of magnets.

13. A train signal and control system having a track-circuit adapted to be grounded by rolling stock, and having included therein stationary track magnets arranged in series in a different block from that in which the ground may be effected, in combination with a traveling train-carried armature disposed in the field of said magnets, and of a length less than the interval between the fields of adjacent magnets.

14. A train signal and control system having a track circuit adapted to be grounded in one block by rolling stock, and having included therein stationary track magnets arranged in series extending substantially throughout another block, a traveling train-carried armature moving in the field of said magnets, and train control apparatus actuable by said armature.

15. A train signal and control system having a track-circuit adapted to be grounded in one block by rolling stock, and having included therein stationary track magnets arranged in series extending substantially throughout another block, a traveling train-carried armature moving in the field of said magnets, and signalling mechanism actuable on de-magnetization of said armature.

16. A train signal and control mechanism embodying track magnets included in circuit with a source of energy and producing a magnetic field the operative length of which is adapted to be varied by the presence of a vehicle upon the track rails.

17. A train signal and control mechanism embodying track magnets included in circuit with a source of energy and affording a magnetic field adapted to be traversed by a vehicle-carried element, and means responsive to the presence of a vehicle on the track for effecting a variation in the operative length of said magnetic field.

18. A train signal and control mechanism embodying track magnets included in circuit with a source of energy and producing a magnetic field of a desired length, and means for effecting a variation in the operative length of said magnetic field, said means being responsive to the presence of a vehicle on the track.

19. A train signal and control mechanism embodying track magnets included in circuit with a source of energy and producing a magnetic field, and means whereby the track circuit is grounded due to the presence of a vehicle in one block, said means acting to effect a variation in the operative length of the magnetic field in a block or blocks separate from that in which the ground is effected.

20. A train signal and control mechanism embodying track magnets included in circuit with a source of energy and producing a magnetic field of a desired length extending within a succession of blocks, and means for effecting a variation in the operative length of the magnetic field afforded by the track magnets in a block or blocks other than the block in which the track circuit may be grounded by the presence of a vehicle in said occupied block.

21. A train signal and control mechanism embodying track magnets included in circuit with a source of energy and producing a magnetic field extending within a succession of blocks, said circuit including means responsive to the presence of a vehicle in one block and operating to effect a variation in the operative length of the magnetic field afforded by the track magnets in the blocks other than the one occupied by said vehicle.

22. A train signal and control mechanism embodying a track equipment having magnets connected in circuit with a source of energy and producing a magnetic circuit extending within a succession of blocks, said track equipment including means responsive to the presence of a vehicle in one block and operating to effect a variation in the operative length of the magnetic field afforded by the track magnets in blocks other than the one occupied by said vehicle.

23. A train signal and control mechanism embodying a track equipment having magnets connected in circuit with a source of energy and producing a magnetic circuit extending within a succession of blocks, said track equipment including an electrically operated element included in said track circuit and responsive to the presence of a vehicle in one block and operating to effect a variation in the operative length of the magnetic field afforded by the track magnets in blocks other than the one occupied by said vehicle.

24. A train signal and control mechanism embodying a track equipment having magnets connected in circuit extending within a succession of blocks, said track equipment including a plurality of solenoids included in said track circuit and connected to be responsive to the presence of a vehicle in one block and operating to effect a variation in the operative length of the magnetic field afforded by the track magnets in blocks other than the one occupied by said vehicle.

25. A train signal and control mechanism embodying track magnets included in circuit with a source of energy and affording a magnetic field extending within a succession of blocks, and means responsive to the presence of a vehicle in one block for effecting a variation in the operative length of the magnetic field afforded by said track magnets in a block or blocks other than the one occupied by said vehicle, in combination with a vehicle element movable within the magnetic field.

26. A train signal and control mechanism embodying track magnets included in circuit with a source of energy and affording a magnetic field extending within a succession of blocks, and means responsive to the presence of a vehicle in one block for effecting a variation in the operative length of the magnetic field afforded by said track magnets in a block or blocks other than the one occupied by said vehicle, in combination with a vehicle carried element separated from said track magnets by an intervening air gap and movable within the magnetic field afforded by said magnets.

27. A train signal and control mechanism embodying a plurality of series of track magnets included in circuit with a source of energy and affording a plurality of magnetic fields extending within a succession of blocks, combined with vehicle carried means movable within the magnetic fields afforded by said track magnets.

28. A train signal and control mechanism embodying a plurality of series of track magnets included in circuit with a source of energy and affording a plurality of magnetic fields extending within a succession of blocks, and means responsive to the presence of a vehicle in one block for effecting a variation in the operative length of said plurality of magnetic fields in a block or blocks other than the one occupied by said vehicle.

29. A train signal and control mechanism embodying a plurality of series of track magnets included in circuit with a source of energy and affording a plurality of magnetic fields extending within a succession of blocks, and means for effecting a variation in the operative length of each magnetic field afforded by each series of track magnets in a block or blocks other than the one occupied by a vehicle, said means being responsive to the presence of the vehicle in the occupied block.

30. A train signal and control mechanism embodying a plurality of series of track magnets included in circuit with a source of energy and producing a plurality of magnetic fields each of a desired length and extending within a succession of blocks, combined with means responsive to the presence of a vehicle in one block for effecting a variation in the operative lengths of said magnetic fields afforded by said track magnets in a block or blocks other than the one occupied by said vehicle, said means operating to so vary the relation of the magnets in one series to the magnets in the other series as to effect an overlap in the magnetic fields afforded by said two series of track magnets.

In testimony whereof I have hereunto signed my name.

CHARLES W. BREWSTER.